Patented Jan. 3, 1950

2,493,632

UNITED STATES PATENT OFFICE 2,493,632

SALT-TYPE COMBINATIONS OF p-AMINO-METHYL-BENZENE-SULFONAMIDES AND SUBSTITUTED p-AMINO-BENZENE-SULFONAMIDES

William A. Lott, Maplewood, and Kathryn A. Losee, New Brunswick, N. J., assignors to E. R. Squibb & Sons, New York, N. Y., a corporation of New York No Drawing. Application March 6, 1947, Serial No. 732,920

4 Claims. (Cl. 260—239.6)

This invention relates to pharmaceuticals; and it has for its object the provision of advantageous pharmaceuticals essentially comprising combinations of certain chemotherapeutic agents, and a method of obtaining such pharmaceuticals.

The pharmaceuticals of this invention essentially comprise a salt-type combination of a chemotherapeutic basic p-aminomethyl-benzene-sulfonamide (especially homosulfanilamide) and a chemotherapeutic, relatively strongly-acid, substituted p-amino - benzene-sulfonamide. These salt-type combinations are stable, and have been found to have the chemotherapeutic actions of both the sulfonamide components; and, in addition, certain chemical and/or physical properties advantageously utilizable in therapy.

The term "a p-aminomethyl-benzene-sulfonamide," as employed herein, means a member of the genus composed of homosulfanilamide [otherwise known as α-amino-p-toluenesulfanilamide] and its derivatives. This genus comprises compounds described in U. S. Patent 2,288,531, dated June 30, 1942, i. e., compounds of the following formula

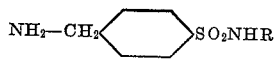

wherein R is a member of the class consisting of hydrogen, alkyl, phenylalkyl, hydroxyalkyl, alkoxyalkyl, carboxylic acid acyl, and heterocyclic groups. Thus, the genus comprises such compounds as: homosulfanilamide; 2-(p-aminomethyl - benzene - sulfonamido)-pyridine; 2-(p-aminomethyl-benzene-sulfonamido)-thiazole; 2-(p-aminomethyl-benzene - sulfonamido)-pyrimidine; and 2-(p-aminomethyl-benzene-sulfonamido)-4,6-dimethyl-pyrimidine.

The term "a relatively strongly-acid, substituted p-amino-benzene-sulfonamide," as employed herein, means a derivative of sulfanilamide in which one or more of the hydrogens of the amido and/or amino groups has been replaced by another group or groups, which substituted sulfanilamide is more strongly acidic than sulfanilamide. Thus, the genus comprises such compounds as: sulfathiazole; N¹-benzoyl-sulfanilamide; sulfadiazine; 2-(p-amino-benzene-sulfonamido)-Δ²-thiazoline; sulfamerazine; sulfamethazine; and sulfapyrazine.

The salt-type combinations of this invention may be obtained by a method essentially comprising interacting a basic p-aminomethyl-benzene-sulfonamide and a relatively strongly-acid substituted p-amino-benzene-sulfonamide in a solvent for the reactants, especially in a substantially dry alcohol (e. g., absolute ethanol), and recovering the salt-type combination formed.

The salt-type combination initially obtained may be therapeutically used without further purification, inasmuch as any excess or unreacted components of the reaction mixture would not interfere with such use.

The thus-obtained homosulfanilamide salt of sulfathiazole, for example, is stable, and has the chemotherapeutic actions of both homosulfanilamide and sulfathiazole. The salt is especially suitable for the topical treatment of infected traumatized areas, being active against the following organisms, inter alia: Gram-positive bacteria, e. g., *Staphylococcus aureus*; Gram-negative bacteria, e. g., *Klebsiella pneumoniae* (Friedländer's bacillus); and acid-fast bacteria, e. g., *Mycobacterium tuberculosis* (variety hominis).

The chemotherapeutic agents employed in the practice of this invention may be only partially purified, inasmuch as further purification is effected in the recovery and purification of the salt formed. Preferably, the chemotherapeutic agents employed are of such purity as to be therapeutically-utilizable per se.

The following examples are illustrative of the invention:

EXAMPLE 1

*Preparation of the homosulfanilamide salt of sulfathiazole*

12.7 g. sulfathiazole is dissolved in 400 cc. hot absolute alcohol; 9.3 g. homosulfanilamide is dissolved in 100 cc. hot absolute alcohol; and the two solutions are combined, filtered hot, and then allowed to cool. The crystals which form on cooling of the reaction mixture are filtered off. The product, the homosulfanilamide salt of sulfathiazole, obtained in a yield of 15 g., melts at 165–7° C.; and after recrystallization from alcohol, it melts at 166–8° C.

EXAMPLE 2

*Preparation of the homosulfanilamide salt of N¹-benzoyl-sulfanilamide*

18.6 g. homosulfanilamide is dissolved in 500 cc. hot absolute alcohol; the solution is added to a solution of 27.6 g. N¹-benzoyl-sulfanilamide in 500 cc. hot absolute alcohol; and the reaction mixture is filtered hot and then allowed to cool for 12–16 hours. The crystals which form on cooling are filtered off. The product, the homosulfanilamide salt of N¹-benzoyl-sulfanilamide, obtained in a yield of 34.5 g., melts at 173–4° C.;

and after recrystallization from absolute alcohol, it melts at 174–5° C.

On replacement of the homosulfanilamide in either of the foregoing examples with any other chemotherapeutic basic p-aminomethyl-benzene-sulfonamide, the corresponding salt of the replacing p-aminomethyl-benzene-sulfonamide is obtained; and on replacement of the sulfathiazole employed in Example 1 with any other chemotherapeutic, relatively strongly-acid, substituted p-amino-benzene-sulfonamide, the homosulfanilamide salt of the replacing substituted p-amino-benzene-sulfonamide is obtained. Among such other substituted p-amino-benzene-sulfonamides thus utilizable in the practice of this invention are: sulfadiazine, sulfamerazine, sulfapyrazine, sulfamethazine, and sulfapyridine.

The salt-type combinations of this invention are therapeutically utilizable wherever therapy with the p-aminomethyl-benzene-sulfonamide component thereof is indicated (with the advantage of being more generally effective, because active against a wider variety of organisms); especially, wherever therapy with both the sulfonamide components is indicated. These salt-type combinations are especially adapted for dusting (in the powder form obtained on freeze-dying) on or into wounds (including burns), and may be mixed for this purpose with the usual inert diluents or carriers (impalpable inert powders), e. g., talc, zinc stearate, or corn starch.

The invention may be variously otherwise embodied within the scope of the appended claims.

We claim:

1. The p-aminomethyl-benzene-sulfonamide salt of a member of the group consisting of sulfathiazole, N'-benzoyl-sulfanilamide, sulfadiazine, 2-(p-amino-benzene-sulfonamido)-$\Delta^2$-thiazoline, sulfamerazine, sulfamethazine, and sulfapyrazine.

2. The method which comprises interacting p-amino-methyl-benzene-sulfonamide and a member of the group consisting of sulfathiazole, N'-benzoyl-sulfanilamide, sulfadiazine, 2-(p-amino-benzene-sulfonamido)-$\Delta^2$-thiazoline, sulfamerazine, sulfamethazine, and sulfapyrazine in a substantially dry alcohol at elevated temperature, and recovering the crystals formed on cooling.

3. The p-aminomethyl-benzene-sulfonamide salt of sulfathiazole.

4. The p-aminomethyl-benzene-sulfonamide salt of $N^1$-benzoyl-sulfanilamide.

WILLIAM A. LOTT.
KATHRYN LOSEE.

REFERENCES CITED

The following references are of record in the file of this patent:

UNITED STATES PATENTS

| Number | Name | Date |
| --- | --- | --- |
| 2,288,531 | Klarer | June 30, 1942 |
| 2,341,086 | Dohrn | Feb. 8, 1944 |
| 2,352,012 | Rosicky | June 20, 1944 |
| 2,361,624 | Hamilton | Oct. 31, 1944 |
| 2,369,711 | Blythe | Feb. 20, 1945 |
| 2,385,262 | Curtis | Sept. 18, 1945 |
| 2,389,582 | Winnek et al. | Nov. 20, 1945 |
| 2,411,495 | Dohrn | Nov. 19, 1946 |

OTHER REFERENCES

Miller et al.: "J. Am. Chem. Soc.," vol. 62 (1940), pp. 2099 to 2102.

J. Am. Pharm. Assoc. (Prac. Pharm. Ed.), Dec. 1943, page 402.

Bergeim et al.: "J. Am. Chem. Soc.," vol. 66 (1944), pp. 1459–1460.

Jensen et al.: "Hoppe-Seylers-Zeit. Physiol Chem.," vol. 280 (1944), pp. 35 to 38.

Barry et al.: "J. Amer. Pharm. Assoc." (Scientific Edition), Sept. 1945, pp. 244–245.

Lawrence: "J. Bact.," vol. 49, pp. 149–150 (1945).